(12) United States Patent
Clark et al.

(10) Patent No.: US 10,830,060 B2
(45) Date of Patent: Nov. 10, 2020

(54) ENGINE COMPONENT WITH FLOW ENHANCER

(71) Applicant: General Electric Company, Schenectady, NY (US)

(72) Inventors: Emily Rosette Clark, Cincinnati, OH (US); Julienne LaChance, Princeton, NJ (US); William Robb Stewart, Boston, MA (US); Todd Garrett Wetzel, Rexford, NY (US)

(73) Assignee: General Electric Company, Schenectady, NY (US)

( * ) Notice: Subject to any disclaimer, the term of this patent is extended or adjusted under 35 U.S.C. 154(b) by 244 days.

(21) Appl. No.: 15/368,076

(22) Filed: Dec. 2, 2016

(65) Prior Publication Data

US 2018/0156044 A1   Jun. 7, 2018

(51) Int. Cl.
F01D 5/18     (2006.01)
F23R 3/00     (2006.01)
F01D 9/04     (2006.01)

(52) U.S. Cl.
CPC ............. F01D 5/189 (2013.01); F01D 5/187 (2013.01); F23R 3/005 (2013.01); *F01D 9/04* (2013.01); *F05D 2220/32* (2013.01); *F05D 2240/126* (2013.01); *F05D 2250/12* (2013.01); *F05D 2260/22141* (2013.01); *F23R 3/002* (2013.01); *F23R 2900/03045* (2013.01); *Y02T 50/676* (2013.01)

(58) Field of Classification Search
CPC . F01D 5/187; F01D 5/189; F01D 9/04; F23R 3/005; F23R 2900/03045; F05D 2240/126; F05D 2220/32; F05D 2250/12; F05D 2260/221; F05D 2260/2212; F05D 2260/2214; F05D 2260/22141
See application file for complete search history.

(56) References Cited

U.S. PATENT DOCUMENTS

| | | | | |
|---|---|---|---|---|
| 3,171,631 A * | 3/1965 | Aspinwall | ............... | F01D 5/187 416/233 |
| 4,407,632 A * | 10/1983 | Liang | ...................... | F01D 5/187 415/115 |
| 4,514,144 A * | 4/1985 | Lee | ........................... | B22C 9/04 416/96 R |
| 4,992,026 A * | 2/1991 | Ohtomo | .................. | F01D 5/187 415/115 |
| 5,472,316 A * | 12/1995 | Taslim | .................... | F01D 5/187 416/96 R |
| 5,536,143 A * | 7/1996 | Jacala | ..................... | F01D 5/187 416/96 R |
| 5,681,144 A * | 10/1997 | Spring | .................... | F01D 5/187 415/115 |
| 5,700,132 A * | 12/1997 | Lampes | .................. | F01D 5/187 415/115 |

(Continued)

*Primary Examiner* — David E Sosnowski
*Assistant Examiner* — Hakeem M Abdellaoui
(74) *Attorney, Agent, or Firm* — McGarry Bair PC

(57) ABSTRACT

An apparatus for cooling an engine component such as a turbine engine airfoil, including a wall bounding an interior extending axially between a leading edge and a trailing edge and radially between a root and a tip. A cooling circuit it located within the interior of the airfoil can include a flow enhancer permitting a volume of fluid, such as air, to pass around the flow enhancer.

29 Claims, 6 Drawing Sheets

(56) References Cited

U.S. PATENT DOCUMENTS

| | | | | |
|---|---|---|---|---|
| 5,762,471 A * | 6/1998 | Cunha | F01D 5/189 | 415/115 |
| 5,842,829 A * | 12/1998 | Cunha | F01D 5/186 | 415/115 |
| 6,227,804 B1 * | 5/2001 | Koga | F01D 5/187 | 415/115 |
| 6,554,571 B1 * | 4/2003 | Lee | F01D 5/187 | 416/92 |
| 7,544,044 B1 * | 6/2009 | Liang | F01D 5/188 | 416/96 R |
| 8,690,538 B2 * | 4/2014 | Levine | F01D 5/187 | 415/115 |
| 8,920,122 B2 * | 12/2014 | Lee | F01D 5/182 | 416/97 R |
| 9,091,495 B2 * | 7/2015 | Lee | F01D 5/187 | |
| 9,920,635 B2 * | 3/2018 | Bommisetty | F01D 5/188 | |
| 2006/0051208 A1 * | 3/2006 | Lee | F01D 5/187 | 416/97 R |
| 2006/0093480 A1 * | 5/2006 | Cunha | F01D 5/187 | 416/97 R |
| 2006/0239820 A1 * | 10/2006 | Kizuka | F01D 5/187 | 416/97 R |
| 2009/0060715 A1 * | 3/2009 | Kopmels | F01D 5/187 | 415/115 |
| 2009/0068022 A1 * | 3/2009 | Liang | F01D 5/187 | 416/97 R |
| 2009/0126335 A1 * | 5/2009 | Fujimoto | F01D 5/187 | 60/39.83 |
| 2010/0054915 A1 * | 3/2010 | Devore | F01D 5/189 | 415/116 |
| 2015/0159489 A1 * | 6/2015 | Lee | F01D 5/187 | 416/97 R |
| 2015/0198050 A1 * | 7/2015 | Lee | F01D 5/188 | 415/115 |
| 2016/0032730 A1 * | 2/2016 | Thomen | F01D 5/187 | 415/115 |
| 2016/0237849 A1 * | 8/2016 | King | F01D 5/187 | |
| 2016/0290139 A1 * | 10/2016 | Snyder | F01D 5/181 | |
| 2016/0312624 A1 * | 10/2016 | Loricco | F01D 25/12 | |
| 2017/0016338 A1 * | 1/2017 | Porter | F01D 9/041 | |
| 2017/0138204 A1 * | 5/2017 | Jimbo | F01D 5/187 | |
| 2017/0159456 A1 * | 6/2017 | Spangler | F01D 5/189 | |
| 2017/0335716 A1 * | 11/2017 | Bergholz | F01D 5/188 | |
| 2018/0058225 A1 * | 3/2018 | Marsh | F01D 5/187 | |
| 2018/0156044 A1 * | 6/2018 | Clark | F23R 3/005 | |

* cited by examiner

ENGINE COMPONENT WITH FLOW ENHANCER

BACKGROUND OF THE INVENTION

Turbine engines, and particularly gas or combustion turbine engines, are rotary engines that extract energy from a flow of combusted gases passing through the engine onto a multitude of rotating turbine blades.

Turbine engines for aircraft, such as gas turbine engines, are often designed to operate at high temperatures to maximize engine efficiency, so cooling of certain engine components, such as the high-pressure turbine and the low-pressure turbine, can be beneficial. Typically, cooling is accomplished by ducting cooler air from the high and/or low-pressure compressors to the engine components that require cooling. Temperatures in the high-pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine components, such as airfoils, can include one or more interior cooling circuits for routing the cooling air through the airfoil to cool different portions of the airfoil, and can include dedicated cooling circuits for cooling different portions of the airfoil, such as the leading edge, trailing edge, or tip.

BRIEF DESCRIPTION OF THE INVENTION

In one aspect, an airfoil for a turbine engine, the airfoil comprising an outer wall having an outer surface and an inner surface bounding an interior space, the outer wall defining a pressure side and a suction side extending axially between a leading edge and a trailing edge defining a chord-wise direction and extending radially between a root and a tip defining a span-wise direction, a cooling circuit located in the interior space and having a peripheral wall forming a cooling passage defining a flow direction, and at least one flow enhancer at least partially spanning the cooling passage and having a body with opposing ends, with at least one of the ends mounted to the peripheral wall and the body spaced from the peripheral wall.

In another aspect, an engine component for a gas turbine engine, the engine component comprising a cooling circuit having a peripheral wall forming a cooling passage with at least one flow enhancer having a body with opposing ends, with at least one of the ends mounted to the peripheral wall and the body spaced from the peripheral wall.

DESCRIPTION OF EMBODIMENTS OF THE INVENTION

Figure 1:
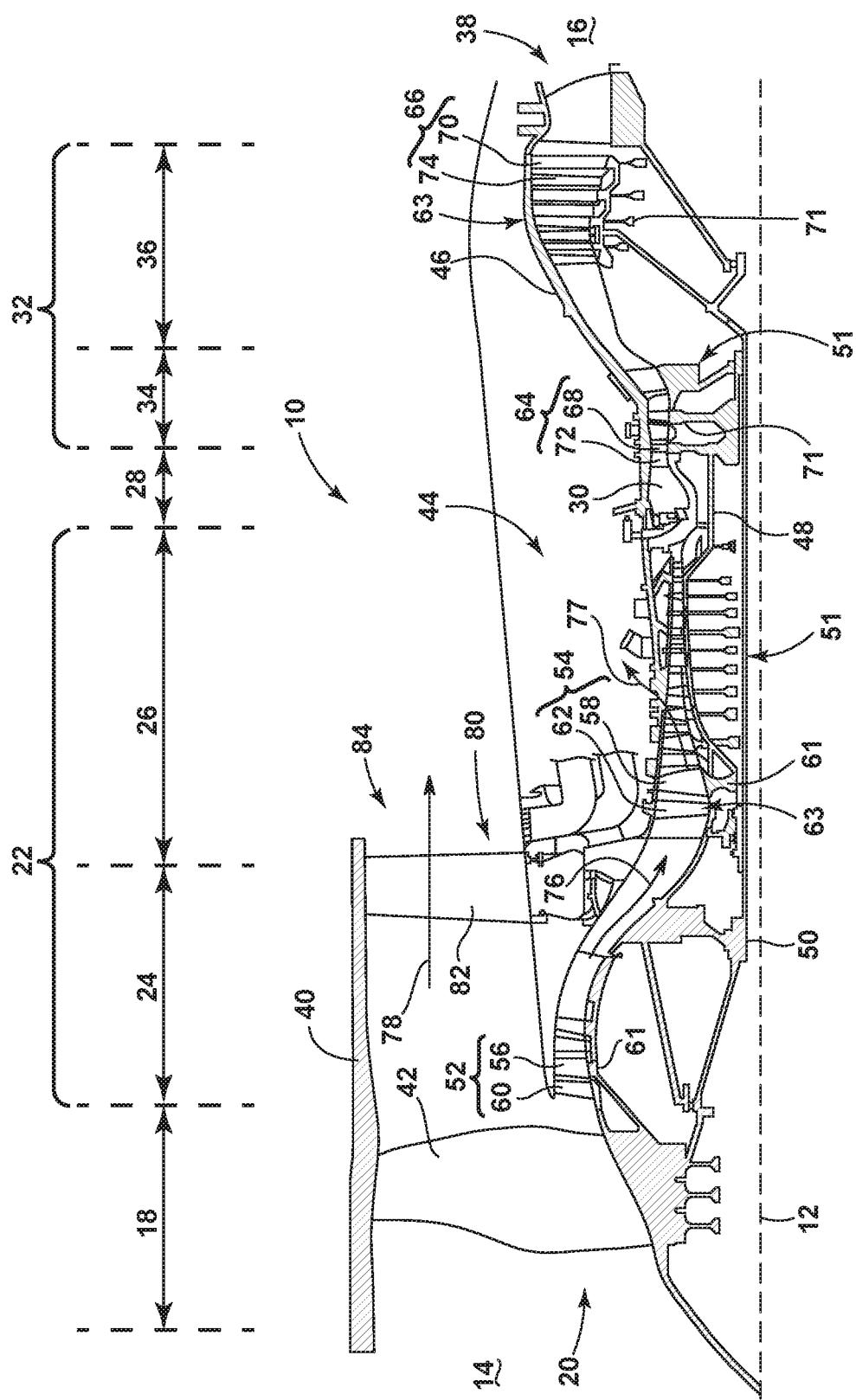
FIG. 1 is a schematic cross-sectional diagram of a turbine engine for an aircraft.

The described embodiments of the present invention are directed to a component for a turbine engine. For purposes of illustration, the present invention will be described with respect to an airfoil for an aircraft gas turbine engine. It will be understood, however, that the invention is not so limited and may have general applicability within an engine, including compressors, as well as in non-aircraft applications, such as other mobile applications and non-mobile industrial, commercial, and residential applications. Additionally, the aspects will have applicability outside of an airfoil, and can extend to any engine component requiring cooling, such as a blade, vane, shroud, or a combustion liner in non-limiting examples.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be draw from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
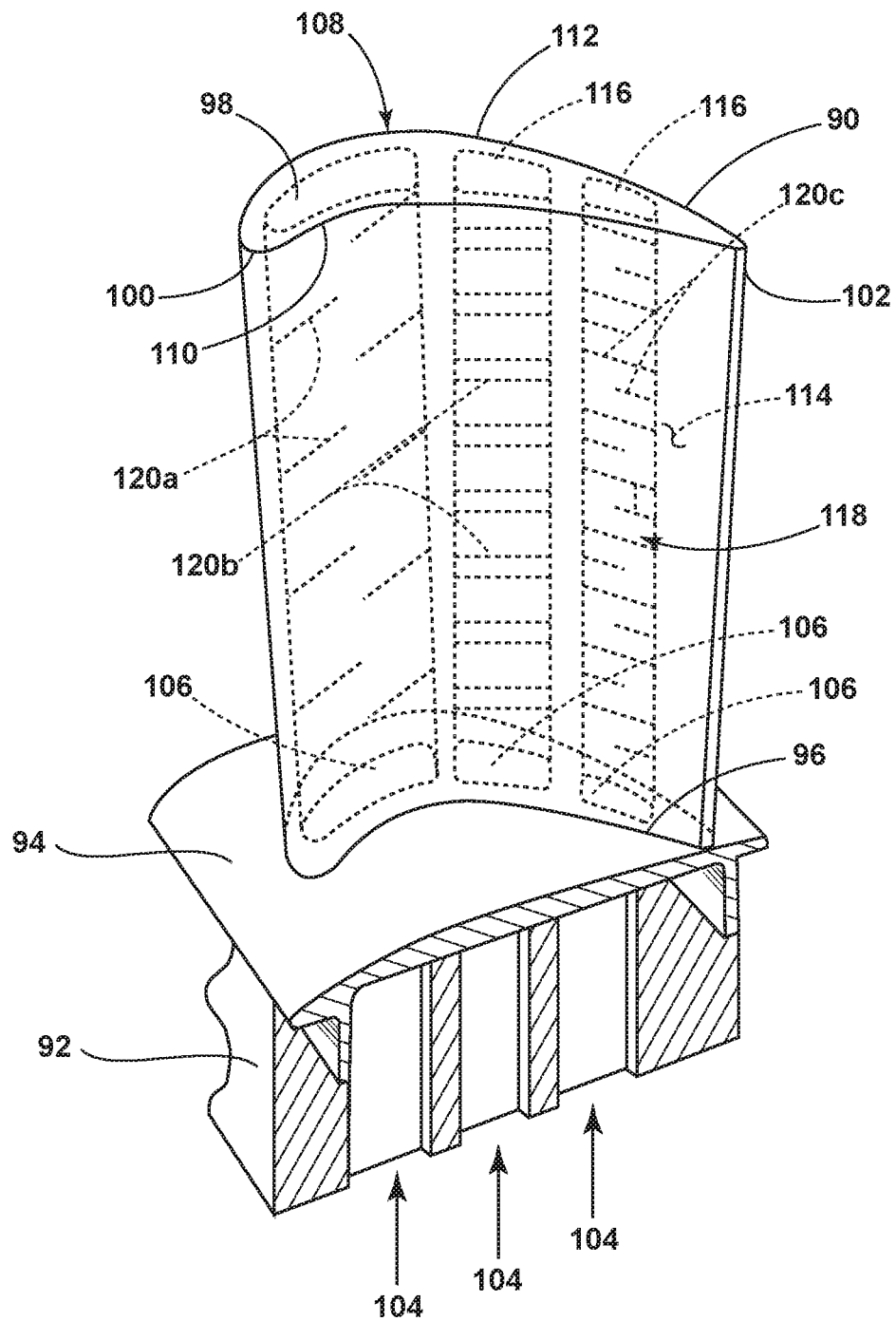
FIG. 2 is a partially-sectioned, perspective view of an airfoil of the turbine engine of FIG. 1 and illustrating air flow passages within the airfoil.

Referring now to FIG. 2, an engine component is shown in the form of an airfoil 90, which can be one of the turbine blades 68 of the engine 10 of FIG. 1 for example. Alternatively, the engine component can include a vane, a shroud, or a combustion liner in non-limiting examples, or any other engine component that can require or utilize cooling. The airfoil 90 includes a dovetail 92 and a platform 94. The airfoil 90 extends radially between a root 96 and a tip 98 defining a span-wise direction. The airfoil 90 extends axially between a leading edge 100 and a trailing edge 102 defining a chord-wise direction. The dovetail 92 can be integral with the platform 94, which can couple to the airfoil 90 at the root 96. The dovetail 92 can be configured to mount to a turbine rotor disk on the engine 10. The platform 94 helps to radially contain the turbine airflow. The dovetail 92 comprises at least one inlet passage 104, shown as three exemplary inlet passages 104, each extending through the dovetail 92 in fluid communication with the airfoil 90 at a passage outlet 106. It should be appreciated that the dovetail 92 is shown in cross-section, such that the inlet passages 104 are housed within the dovetail 92.

The airfoil 90 includes an outer wall 108 having a pressure side 110 and a suction side 112 extending between the leading edge 100 and the trailing edge 102. An interior 114 of the airfoil 90 is defined by the outer wall 108. Cooling passages 116 extend within the interior 114 from the root 96 toward the tip 98 and are at least partially defined by the outer wall 108. The cooling passages 116 can define one or more cooling circuits 118 throughout the airfoil 90.

The cooling passages 116 can include a plurality of flow enhancers 120 arranged such that they are angled between 0 and 90 degrees with respect to a plane parallel to the platform 94. The flow enhancers 120 by way of non-limiting example can be turbulators, fastback turbulators, pin fins, pin banks, or vortex generators. In a first set of flow enhancers 120a, the flow enhancers are oriented to form a positive angle between 45 and 90 degrees with respect to the plane parallel to the platform 94. In a second set of flow enhancers 120b, the flow enhancers are oriented parallel to the plane parallel to the platform 94. In a third set of flow enhancers 120c, the flow enhancers are oriented to form a negative angle between 45 and 90 degrees with respect to the plane parallel to the platform 94. It is contemplated that the flow enhancers 120 can be arranged in any combination of the arrangements illustrated and are not necessarily uniform or similar in their orientation.

Figure 3:
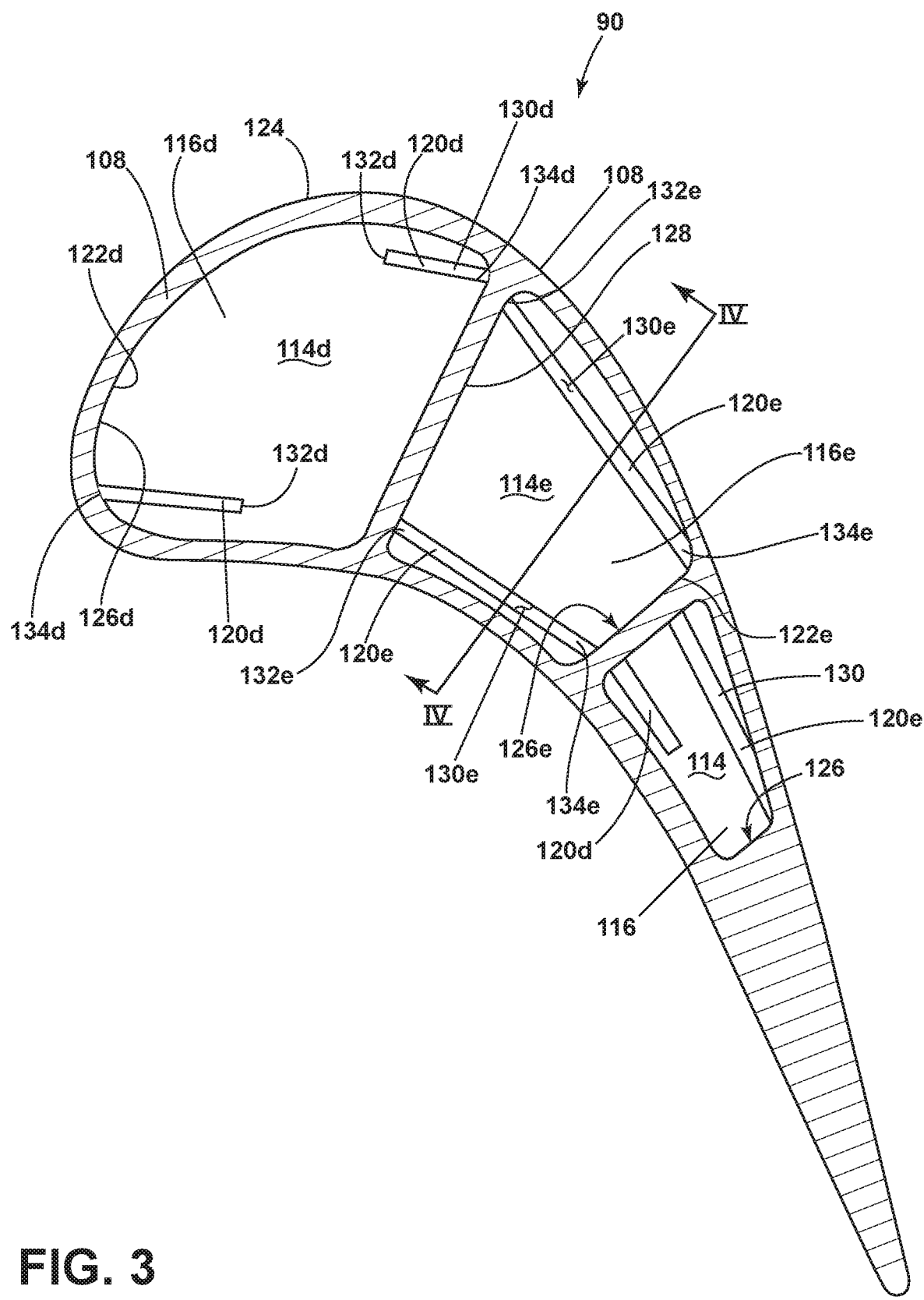
FIG. 3 is a cross-sectional view of the airfoil of FIG. 2 illustrating a wall with ribs defining a portion of some of the passages within an interior of the airfoil.

Turning to FIG. 3, a cross-section of the airfoil 90 illustrates at least three exemplary cooling passages 116. The outer wall 108 includes an inner surface 122 and an outer surface 124. A peripheral wall 126 can include the inner surface 122 of the outer wall 108 and at least one rib 128 separating the interior 114 into the exemplary three cooling passages 116. While illustrated as three cooling passages 116, it should be appreciated that multiple cooling passages or a single cooling passage comprising the entire interior 114 of the airfoil 90 can also be contemplated.

It should be appreciated that while the at least one rib can be multiple ribs 128 illustrated as extending in the substantially span-wise direction, defining substantially span-wise extending passages 116, the ribs 128 can be organized in any direction, such as axial, radial, span-wise, chord-wise, or any combination thereof in non-limiting examples. As such, the passages or any portion of the cooling circuit 118 defined by the passages 116 can extend in any three-dimensional direction.

The cooling passages 116 can define the circuits 118 throughout the airfoil 90.

Additionally, the cooling circuits 118 can further include micro-circuits, sub-circuits, near wall cooling circuits, leading edge passages, trailing edge passages, pin fins, pin banks, additional passages 116, flow augmentation structures, or any other structures which can define the cooling circuits.

The illustrated cooling passages 116 include at least one flow enhancer 120 spanning at least a portion of the cooling passage 116. An exemplary flow enhancer 120d comprising a body 130d with opposing ends 132d, 134d is mounted to the peripheral wall 126 at one end 134d such that the body of the flow enhancer 120d cantilevers into the interior 114d of the cooling passage 116d. The opposing end 132d is spaced from the peripheral wall 126d.

In another exemplary flow enhancer 120e, the body 130e can span the entire cooling passage 116e while remaining spaced from the peripheral wall 126e such that the opposing ends 132e, 134e are both mounted to the peripheral wall 126e. In the illustrated example, one opposing end 132e is mounted to the rib 128 while the other end 134e is mounted to the inner surface 122e.

Figure 5:
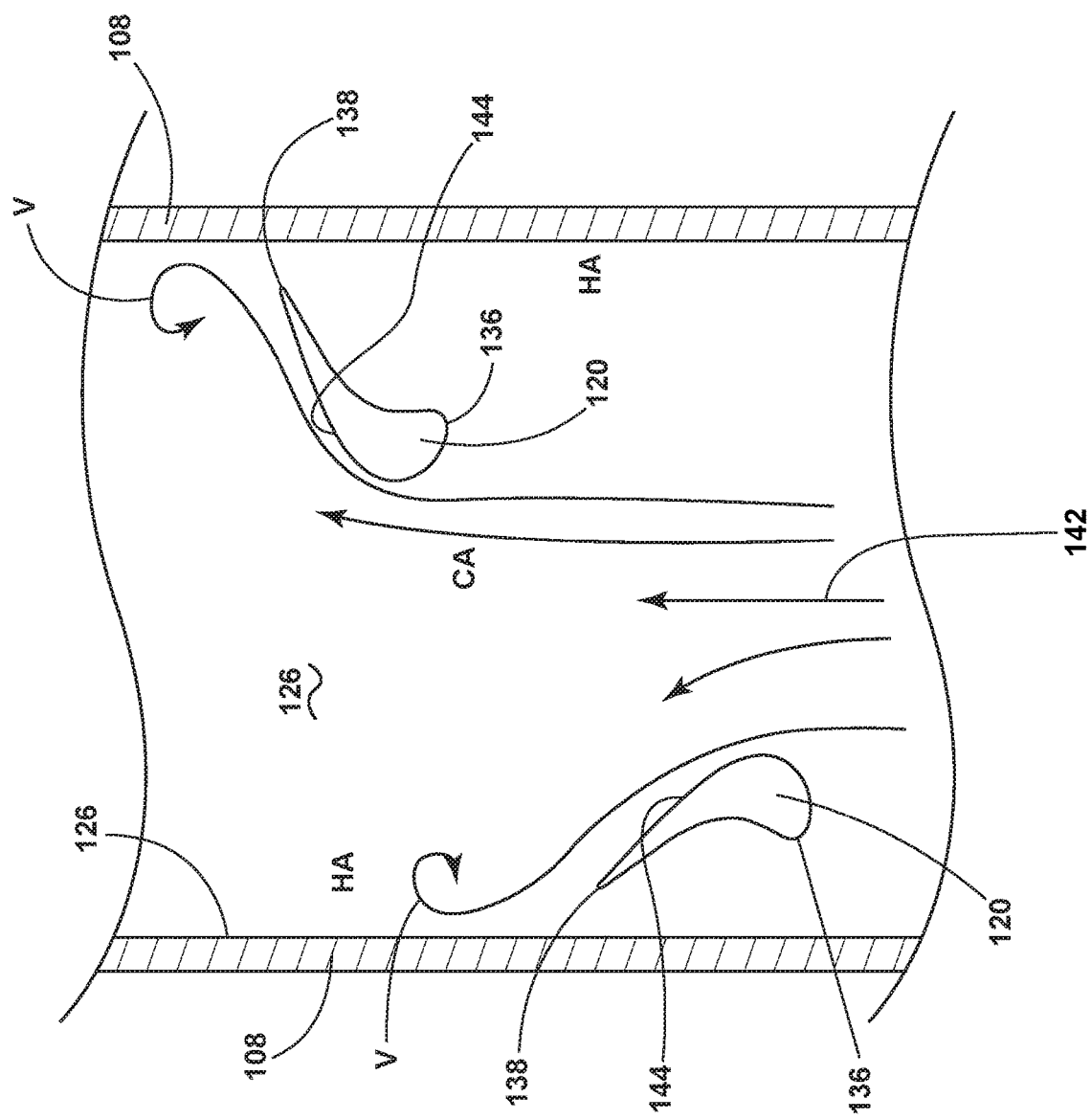
FIG. 5 is the section view of FIG. 4 illustrating an airflow pattern around the set of flow enhancers.

It should be understood that any orientation or combination of exemplary flow enhancers 120 is contemplated. In one non-limiting illustrated example exemplary flow enhancers 120d and 120e are provided in the same cooling passage 116. It is also contemplated that the body 130 is primarily orthogonal to a cooling flow (FIG. 5). The orientation of the body 130 is not limited to any orientation and can be, by way of non-limiting example, angled toward the cooling flow as well.

Figure 4:
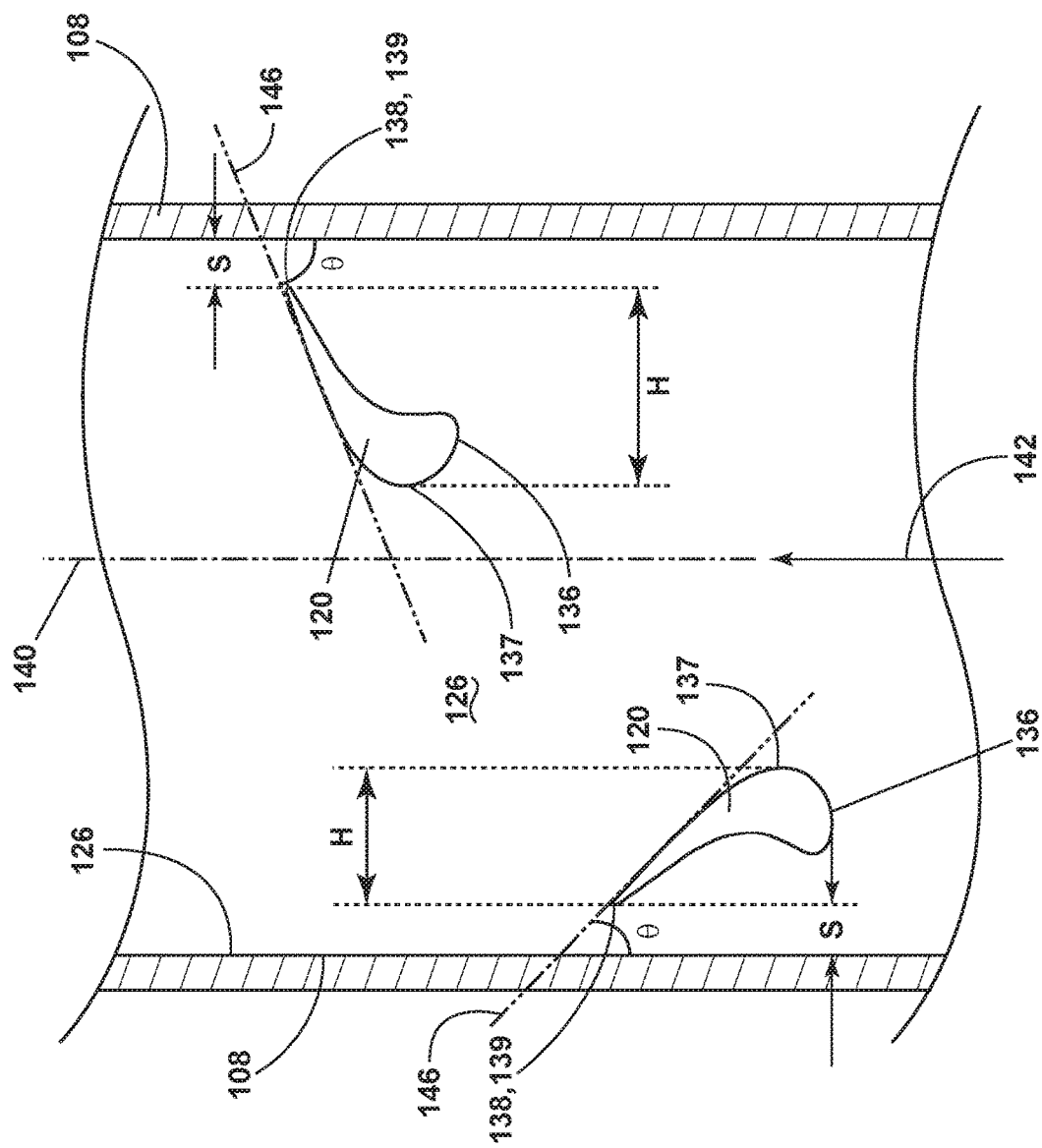
FIG. 4 is a section view taken along the line IVA of an exemplary interior of the airfoil of FIG. 3 illustrating a set of flow enhancers spaced from the wall and extending from the ribs.

Turning to FIG. 4, a cross-section of the airfoil 90 taken along line IV is illustrated with a first exemplary shape of the flow enhancer 120. The exemplary flow enhancer 120 is has an airfoil cross-section with a leading edge 136 and a trailing edge 138 where the trailing edge 138 is closer to the peripheral wall 126. The exemplary flow enhancer 120 has an effective height H measured along a reference line perpendicular to a streamline 140 between a first point 137 on along the leading edge 136 and a second point 139 on the trailing edge 138. The flow enhancer 120 is spaced a distance S from the peripheral wall 126 less than 75% of the height H. It can be contemplated that the distance S is as close as 10% and as far as 100% of the height H. The spacing or height distance is for illustrative purposes only and is not meant to be limiting.

Additionally, a surface face 144 of the flow enhancer 120 is tilted at an angle θ. A tangent line 146 to the surface face 144 passes through the peripheral wall 126 to define the angle θ. The angle θ can be anywhere from 10 to 70 degrees. The angle θ can be different for alternating flow enhancers 120 such that one flow enhancer 120 is oriented at an angle smaller than the other of the flow enhancers 120.

Turbine components such as blades, vanes and shrouds are exposed to extremely hot gas path temperatures that result in the components requiring internal cooling. Often cooling flow is not adequate and heat transfer enhancement features are required to improve cooling effectiveness. Heat transfer enhancement features include pins, dimples, bumps, and flow enhancers. These features enhance turbulence in the cooling circuit resulting in higher heat transfer coefficients on the cavity walls.

Turning to FIG. 5, the flow enhancers described herein solve two problems for turbine component cooling. First, like conventional flow enhancers the flow enhancers 120 enhance turbulence in the cooling flow by generating vortices V. The vortices V can be increased or decreased depending on other requirements of the airfoil, by way of non-limiting example weight restrictions or pressure drop requirements, by changing the shape, size, or orientation of the flow enhancer 120. The flow enhancers 120 also direct cooling air 142 from closer to a center of the cooling passage 116 towards the peripheral wall 126. As this is done repeatedly down passage 116, it provides for better mixing of the flow, which reduces the formation of temperature layers. The peripheral walls 126 can be very hot such that the air that is closest to them is hot air HA, therefore using air further away from the walls 126, cooler air CA, to cool the engine component will result in overall higher cooling effectiveness.

Additionally, the flow enhancers 120 can improve dust resistance of the engine component. Spacing the flow enhancer from a target cooling surface, in the exemplary flow enhancer disclosed herein the peripheral wall 126, eliminates any corners created where the entire body of the conventional flow enhancers attach to the peripheral wall 126 and large amounts of dust collect. The flow enhancers 120 can optionally have, as illustrated, smooth, flat, featureless faces 144 that are less likely to collect dust than a surface with heat transfer enhancement features attached. Also, if dust does build up on the faces 144 of the flow enhancers 120 the impact is significantly lower than dust building up on conventional flow enhancers because the spaced flow enhancer faces 144 are not a targeted cooling surface, as where the conventional flow enhancers are integrated into the target cooling surfaces of the turbine component.

During operation, cooling air 142 flowing through the cooling circuit 11 is introduced such that it confronts the flow enhancer 120 and is directed toward the peripheral wall 126. The space distance S aids in preventing dust from accumulating where the flow enhancer 120 and peripheral wall 126 are closest to each other. A Reynolds number ranging from 20,000 to 100,000 for the cooling air 142 can cause the turbulence required to direct the cooling air 142 to the peripheral wall 126. It should be understood that the flow is not limited to the Reynolds number range 20,000 to 100,000 and that similar outcomes can occur in engine components with different geometries and shapes outside of the Reynolds number range 20,000 to 100,000.

Figure 6:
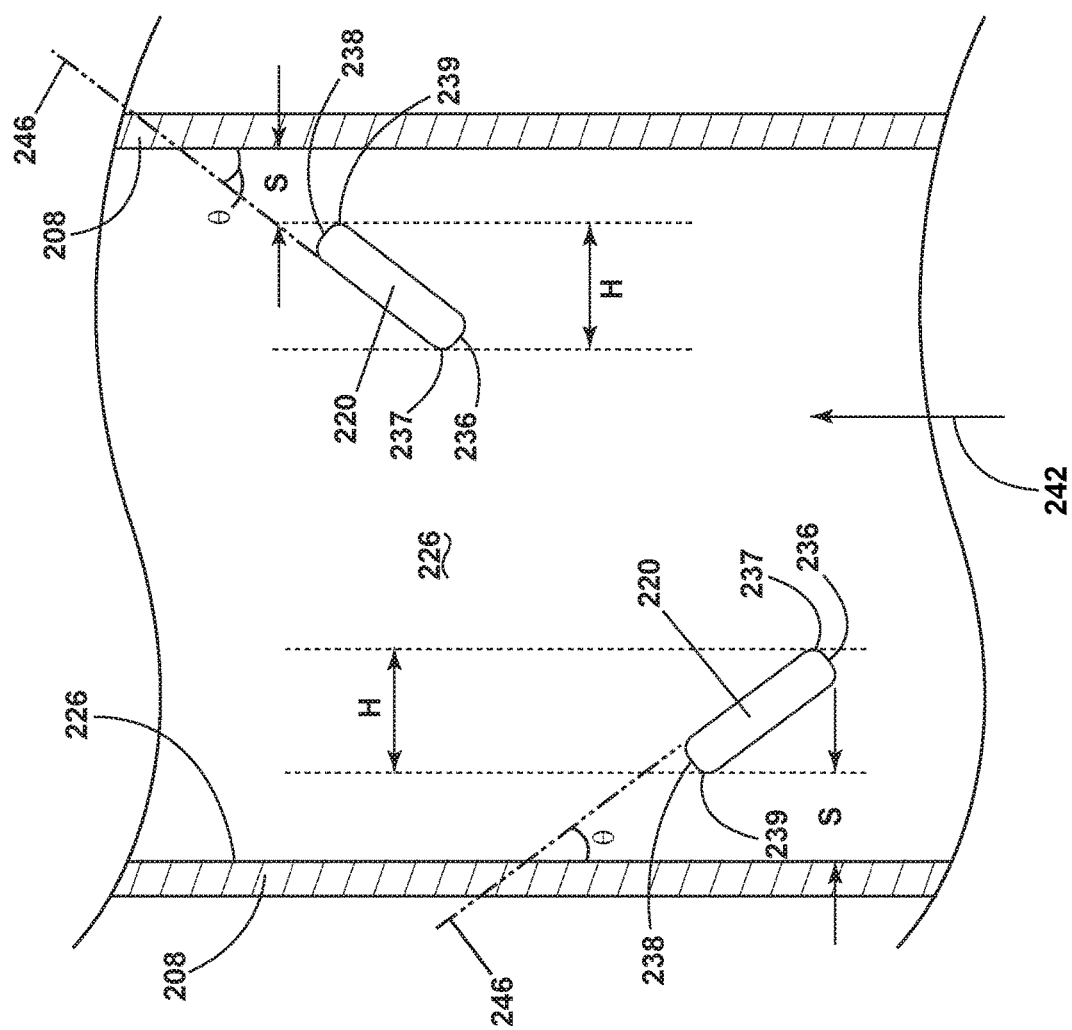
FIG. 6 is a view similar to FIG. 4 but illustrating an alternative set of flow enhancers spaced from the wall and extending from the ribs.

FIG. 6 is a cross-section illustrating a second exemplary shape of a flow enhancer 220. The flow enhancer 220 is similar to flow enhancer 120, therefore like parts will be identified with like numerals increased by 100, with it being understood that the description of the like parts of the first flow enhancer applies to the second flow enhancer, unless otherwise noted. The second exemplary flow enhancer 220 has a rectangular cross-section with first and second ends 236, 238, where the second end 238 is closer to a peripheral wall 226 than the first end 236. Other cross-sections for the flow enhancer 220 are also contemplated, by way of non-limiting example an oval cross-section, a substantially tri-angular cross-section, a diamond cross-section, or a square cross-section. The flow enhancers 220 can be oriented at an angle θ as already described herein.

Benefits associated with the modification of conventional flow enhancers described herein can include promoting turbulence in a cooling passage, resulting in increased internal cooling of the part. Spacing the flow enhancer from the surface allows for increased turbulence but also mixes in cooler air from the center of the cavity. Additionally, conventional flow enhancers can accumulate large amounts of dust on their faces and at the corners where they are attached to the wall. This creates an insulating layer, resulting in lower cooling effectiveness. The flow enhancers described herein are not attached to the cooled wall therefore the dust accumulation on the cooled wall will be reduced, allowing for more effective cooling of the turbine component.

For severe engine operators, or SEOs, dust from the environment is often present in the cooling air. The dust deposits on the cooling surfaces, creating an insulating layer resulting in extremely low cooling effectiveness. Heat transfer enhancement features exacerbate the problem by introducing regions where dust is more prone to collecting. For example, flow enhancers introduce a re-circulation zone that deposits dust in the aft facing corner where the flow enhancer attaches to the wall. Having dust collect in corners and along faces that are an integrated part of the target cooling wall will result in lower cooling effectiveness and higher temperatures of the component, and therefore lower life of the part.

It should be appreciated that while the description is directed toward an airfoil, the concepts as described herein can have equal applicability in additional engine components, such as a vane, shroud, or combustion liner in non-limiting examples, and flow enhancers within the passage of the airfoil can be any similar region of any engine component having a cooling circuit, or an interior cooling surface with a wall separating the hot gas flow and requiring cooling, such as regions typically requiring film cooling holes or multi-bore cooling.

It should be appreciated that application of the disclosed design is not limited to turbine engines with fan and booster sections, but is applicable to turbojets and turbo engines as well, or any other engine requiring fluid cooling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
   an outer wall having an outer surface and an inner surface bounding an interior space, the outer wall defining a pressure side and a suction side extending axially between a leading edge and a trailing edge defining a chord-wise direction and extending radially between a root and a tip defining a span-wise direction;
   a cooling circuit located in the interior space and having a peripheral wall forming a cooling passage defining a flow direction; and
   at least one flow enhancer having an effective height and a body extending between opposing ends in the chord-wise direction at least partially spanning the cooling passage, with at least one of the opposing ends mounted to the peripheral wall and an entire remaining portion of the body extending along and completely spaced from the peripheral wall at the inner surface at a distance less than 100% of the effective height.

2. The airfoil of claim 1 where the at least one flow enhancer spans the passage such that the opposing ends are both mounted to the peripheral wall.

3. The airfoil of claim 1 where at least one rib and the inner surface together form the peripheral wall and the at least one flow enhancer extends from the at least one rib.

4. The airfoil of claim 3 where the airfoil includes multiple ribs and the flow enhancer extends from the at least one rib to another rib opposite the at least one rib.

5. The airfoil of claim 1 where the flow enhancer has an airfoil cross-section.

6. The airfoil of claim 1 where the flow enhancer has a rectangular cross-section.

7. The airfoil of claim 1 where the flow enhancer defines a surface face that is oriented at an angle less than 70° with respect to the peripheral wall.

8. The airfoil of claim 1 where the effective height is measured along a reference line perpendicular to a streamline between two points on the flow enhancer where a first point is closest to the peripheral wall and a second point is furthest from the peripheral wall.

9. The airfoil of claim 8 where the second point is spaced from the peripheral wall at a distance less than 20% of the height.

10. The airfoil of claim 8 where the second point is spaced from the inner surface at a distance less than 75% of the height.

11. The airfoil of claim 1 where the flow enhancer contributes to flow occurring at Reynolds numbers ranging from 20,000 to 100,000.

12. An engine component for a turbine engine, the engine component comprising a cooling circuit having a peripheral wall extending in a first direction and forming a cooling passage with at least one flow enhancer having an effective height and a body extending between opposing ends to define a second direction with at least one of the opposing ends mounted to the peripheral wall and an entire remaining portion of the body extending along and completely spaced from the peripheral wall a distance less than 100% of the effective height;
   wherein the body defines a surface face extending in a third direction perpendicular to the second direction and oriented at an angle less than or equal to 70° with respect to the first direction; and at least one rib and an inner surface together form the peripheral wall and the at least one flow enhancer extends from the at least one rib.

13. The engine component of claim 12 where the at least one flow enhancer spans the passage such that the opposing ends are both mounted to the peripheral wall.

14. The engine component of claim 12 where the engine component includes multiple ribs and the flow enhancer extends from the at least one rib to another rib opposite the at least one rib.

15. The engine component of claim 12 where the flow enhancer has an airfoil cross-section.

16. The engine component of claim 12 where the flow enhancer has a rectangular cross-section.

17. The engine component of claim 12 where the flow enhancer has an effective height measured along a reference line perpendicular to a streamline where the flow enhancer is spaced from the peripheral wall and between two points on the flow enhancer where a first point is closest to the peripheral wall and a second point is furthest from the peripheral wall.

18. The engine component of claim 12 where the second point is spaced from the peripheral wall at a distance less than 20% of the height.

19. The engine component of claim 12 where the second point is spaced from the peripheral wall at a distance less than 100% of the height.

20. The engine component of claim 12 where the flow enhancer contributes to flow occurring at Reynolds numbers ranging from 20,000 to 100,000.

21. The engine component of claim 12 where a cooling flow flows through the cooling passage primarily orthogonal to the body.

22. An airfoil for a turbine engine, the airfoil comprising:
an outer wall having an outer surface and an inner surface bounding an interior space, the outer wall defining a pressure side and a suction side extending axially between a leading edge and a trailing edge defining a chord-wise direction and extending radially between a root and a tip defining a span-wise direction;
a cooling circuit located in the interior space and having a peripheral wall forming a cooling passage defining a flow direction; and
at least one flow enhancer partially spanning the cooling passage and having a body extending between opposing ends, with one of the opposing ends mounted to the peripheral wall and a remaining portion of the body extending along and spaced from the peripheral wall at the inner surface along a full extent of the entire remaining portion.

23. The airfoil of claim 22 where at least one rib and the inner surface together form the peripheral wall and the at least one flow enhancer extends from the at least one rib.

24. The airfoil of claim 22 where the flow enhancer has an airfoil cross-section.

25. The airfoil of claim 22 where the flow enhancer has a rectangular cross-section.

26. The airfoil of claim 22 where the flow enhancer defines a surface face that is oriented at an angle less than 70° with respect to the peripheral wall.

27. The airfoil of claim 22 where the flow enhancer has an effective height measured along a reference line perpendicular to a streamline between two points on the flow enhancer where a first point is closest to the peripheral wall and a second point is furthest from the peripheral wall.

28. The airfoil of claim 27 where the second point is spaced from the peripheral wall at a distance less than 20% of the height.

29. The airfoil of claim 27 where the second point is spaced from the inner surface at a distance less than 100% of the height.

* * * * *